Figure 1:
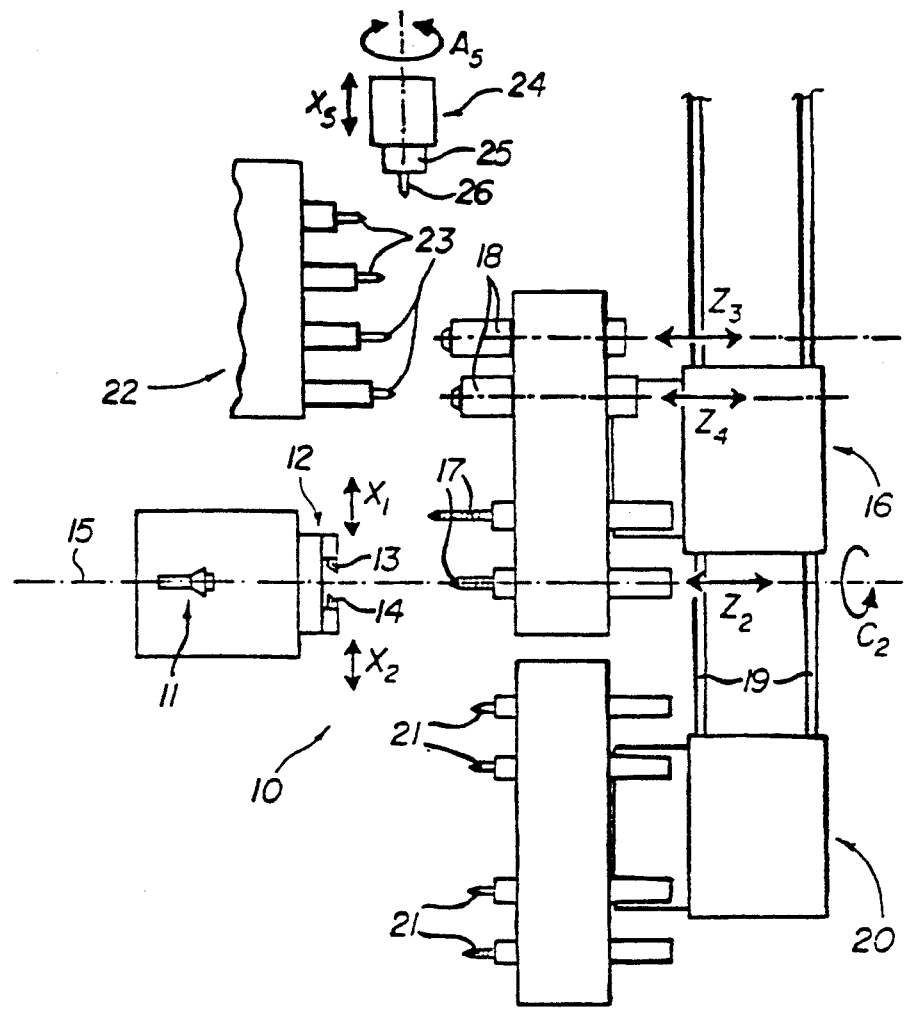

United States Patent [19]
Piguet et al.

[11] Patent Number: 5,210,917
[45] Date of Patent: May 18, 1993

[54] MULTIPLE STATION MACHINE FOR BAR MACHINING

[75] Inventors: Pierre-Louis Piguet, La Chaux-de-Fonds; Hubert Rossetti, Les Geneveys-sur-Coffrane, both of Switzerland

[73] Assignee: Esco S.A., Switzerland

[21] Appl. No.: 776,285

[22] PCT Filed: Mar. 21, 1991

[86] PCT No.: PCT/CH91/00069

§ 371 Date: Nov. 20, 1991

§ 102(e) Date: Nov. 20, 1991

[87] PCT Pub. No.: WO91/14534

PCT Pub. Date: Oct. 3, 1991

[30] Foreign Application Priority Data

Mar. 26, 1990 [FR] France .................. 90 03992

[51] Int. Cl.$^5$ .............................................. B23B 15/00
[52] U.S. Cl. ........................................ 29/36; 29/27 R; 29/33 J
[58] Field of Search .............. 29/36, 38 R, 39, 40, 29/38 C, 564, 27 R, 27 A, 27 C, 33 J; 82/125

[56] References Cited

U.S. PATENT DOCUMENTS

| | | | |
|---|---|---|---|
| 3,821,835 | 7/1974 | Andre et al. | 29/36 |
| 4,597,155 | 7/1986 | Garnett et al. | 29/564 |
| 4,608,747 | 9/1986 | Link et al. | 82/125 X |
| 5,031,490 | 7/1991 | Grossmann | 29/36 X |

FOREIGN PATENT DOCUMENTS

| | | | |
|---|---|---|---|
| 474824 | 6/1951 | Canada | 29/38 R |
| 820519 | 9/1951 | Fed. Rep. of Germany | 29/39 |
| 2401656 | 5/1975 | Fed. Rep. of Germany. | |
| 2846319 | 4/1979 | Fed. Rep. of Germany. | |
| 3626324 | 2/1988 | Fed. Rep. of Germany. | |
| 2526693 | 11/1983 | France | 29/27 R |
| 1271664 | 11/1986 | U.S.S.R. | 29/27 R |
| 1324766 | 7/1987 | U.S.S.R. | 29/38 R |

*Primary Examiner*—William Briggs
*Attorney, Agent, or Firm*—Davis, Bujold & Streck

[57] ABSTRACT

A metal-working machine (10) comprises a first machining unit including a machining head (12) and means (11) in the form of a clamp for bringing, holding and axially displacing the material to be machine. The machining head (12) carries tools (13 and 14) which rotate and move relative to two axes $X_1$ and $X_2$ perpendicular to the axis (15) of the material. The machine also comprises a main turret (16) equipped with machining stations (17) and stations for receiving (18) the parts. In a first option, it comprises a second machining unit (2) carrying machining stations (23). In a second option, it comprises a third machining unit (24) carrying a machining station (26) equipped with a possibly rotating tool (25). In a third option, the machine is completed by an auxiliary turret (20) carrying a machining station (21).

9 Claims, 1 Drawing Sheet

MULTIPLE STATION MACHINE FOR BAR MACHINING

The present invention concerns a metal-working machine in particular for bar machining, comprising a first machining unit comprising a machining head and means for bringing and axially displacing the material to be machined, a principal turret with at least one machining station designed to machine the front surface of a part worked on by said machining head and a second machining unit designed to machine the back surface of said part.

Machines designed for complete machining of parts presently exist on the market, with machining taking place on the front surface, the back surface and along the peripheral surface of these parts. When the part is machined on the front surface and then cut, it is received by a device called a counter-spindle or counter-clamp, according to whether or not the piece is turning, which effects transfer of the part and positioning it across from the machining stations designed for machining the back surface.

In these machines the transfer element is designed to hold the part during cutting. In machines where the part is turning, only one transfer device is available, thereby preventing any other operation from taking place during this transfer phase. In machines where the piece is not turning, there may be two such devices, one of which holds the piece during cutting while the other moves the piece across from a machining station for machining the back surface. This increases output while permitting work on two parts simultaneously.

However, these existing machines have limited possibilities and do not allow more than two machining operations to take place simultaneously.

The present invention proposes to overcome these disadvantages by realizing a machine in which multiple machining operations occur simultaneously and which thereby enables a part to be produced in a fraction of the time previously required, since simultaneous machining of several parts is done at different machining stations. In effect, the machine according to the invention proposes combining the features of a conventional bar machining apparatus with those of a transfer unit, and thus realizes a unique, high performance machine.

This object is achieved by the machining unit according to the invention, characterized in that said principal turret is a revolving lathe-type turret and further comprises at least two receiving stations for parts worked on by said machining head and/or previously machined on their front surface, for simultaneously machining on their back surface while machining another part on said machining head and/or said machining station designed to machine the front surface of said other part.

According to an advantageous embodiment, said part receiving stations are axially movable.

Preferably, the second machining unit comprises several machining stations with axes parallel to the axis of the part and positioned so that the part receiving stations may be placed opposite these machining stations.

According to another embodiment, the machine may comprise a third machining unit with at least one machining station equipped with at least one tool perpendicular to the axis of the part, the tool on said third machining unit being rotatable and the machining station being axially movable in a direction perpendicular to the axis of the part.

In a particularly advantageous embodiment, the machine may comprise an auxiliary turret comprising at least one machining station, the turret being attached to a slide perpendicular to the axis of the part, the machining station being rotatable and axially movable in a direction parallel to the axis of the part.

In another embodiment, the machine may simultaneously comprise a principal turret and an auxiliary turret, these two turrets being attached to the same slide which is movable in a direction perpendicular to the axis of the part.

Figure 2:
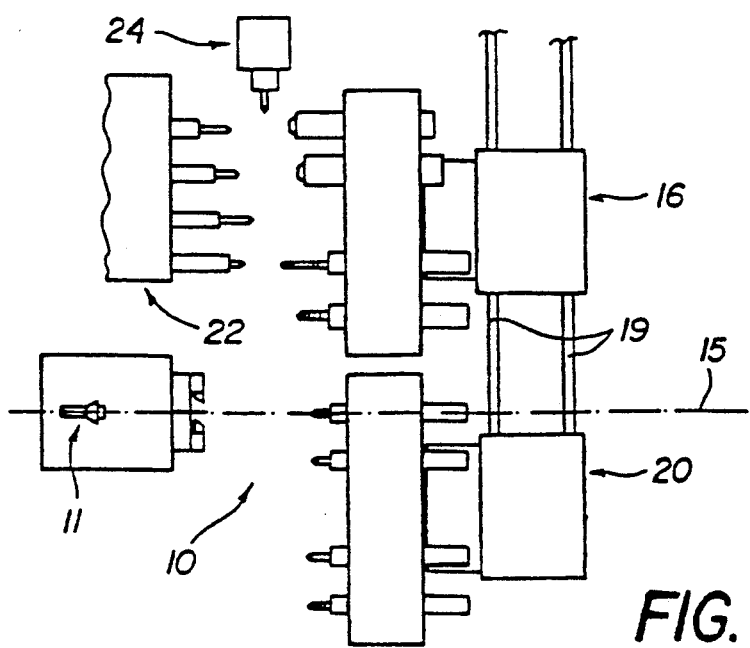

The present invention will be better understood with reference to the description of an exemplary embodiment and to the attached drawing, in which:

FIG. 1 is a schematic view of the machine according to the invention when the principal turret is in a first position; and FIG. 2 is a view similar to that of FIG. 1 when the principal turret is in a second position.

With reference to the drawings, the metal-working machine 10 shown comprises means 11 for bringing the part to be machine, which is in bar or wire form, initially twisted or straightened, to a machining head 12. The material in this case is non-rotating and tools 13 and 14 attached to machining head 12 are caused to rotate around an axis (first) 15 which corresponds to the axis of the part to be machined. These tools, preferably tools for lathing and cutting parts after machining, are in addition movable perpendicularly to axis 15 as shown schematically by double arrows $X_1$ and $X_2$. Elements 11 consist of a clamp which holds the part and makes it advance along axis 15 at a speed determined by control means not shown.

Across from these elements there is a main turret 16 of the revolving lathe-turret type comprising, for example, six work stations which may be machining stations 17 and/or part receiving stations 18. The machine comprises at least two receiving stations, but may have more than this so that a larger number of parts may be worked on simultaneously. Machining stations 17 are for machining the front surface of a part worked on by tools 13 and 14, and receiving stations 18 are for receiving the part during and after cutting, that is, during the operation of detaching the cut part from the bar of material. In addition, these receiving stations are designed to transfer the part to other stations, specifically the stations for machining the back surface or for holding the part during such machining of the back surface.

Machining stations 17 are equipped with tools which are rotatable about a second axis and axially displaceable as shown schematically by double arrows $Z_2$ and $C_2$. The receiving stations 18 advantageously support receiving clamps which are axially movable as shown by double arrows $Z_3$ and $Z_4$, respectively.

Turret 16 is preferably attached to a slide 19 composed of two parallel guides or rails allowing it to be displaced perpendicularly to axis 15.

Accordingly to a particularly advantageous embodiment, machine 10 comprises an auxiliary turret 20 which may be identical to principal turret 16, that is, of the revolving lathe-turret type and having perhaps six machining stations 21. In this case, where these machining stations comprise conventional machining tools, particularly for puncturing, designed to work on the front surface of a part cut by tools 13 and 14, they are preferably movable parallel to the axis. When the part to be machine, that is, the cut part, is turning, the tools at the machining stations can be non-rotating. In the case where the part itself is not caused to rotate, the tools attached to machining stations 21 are, of course, rotating.

Auxiliary turret 20 is also attached to slide 19 and can be displaced in a direction perpendicular to axis 15. The two turrets, the main turret and the auxiliary turret, complement each other in the sense that a partially machined piece may be received by stations 18 and the principal turret can be displaced to take this part to other machining stations which will be described below. Simultaneously, the auxiliary turret may be placed in the front position across from a new part to be machined, thereby allowing simultaneous work at several machining stations.

According to a particularly advantageous variation in which effectiveness of the machine is increased and time for machining parts is considerably reduced, the machine comprises a unit 22 which will hereafter be called the counter-operation plate, supporting perhaps four machining stations 23 designed to work on the back surface of pieces previously machined by tools 13 and 14, treated on the front surface by the tools at machining stations 17, received and held in place or perhaps caused to rotate by receiving stations 18. This counter-operation plate 22 is axially fixed. Conversely, the machining stations may be either fixed or rotating about a third axis.

To complete this machine and increase the possibilities it offers for machining parts, there is provided a machining unit 24 with an axis (forth) perpendicular to axis 15, attached between the main turret and the counter-operation plate in a position allowing it to work on parts received at receiving stations 18 and machined by tools 23 on the counter-operation plate. This machining unit 24 supports at least one machining station 25 equipped with a tool 26 which may be caused to rotate as shown by double arrow A5 and axially displaced in a direction perpendicular to axis 15 as shown by double arrow $X_5$.

According to a preferred embodiment, the base machine comprises the machining head 12 holding tools 13 and 14, means 11 for bringing the part to be machined into the machining head, and principal turret 16. This base unit allows two operations to take place simultaneously, one consisting of cutting a part with tools 13 and 14 and the other consisting of machining the front surface of this part.

A first advantageous option consists of joining counter-operation plate 22 to this base unit. In this option, at least three interventions can be effected simultaneously, since at least one part previously machined as described above may be received by stations 18 and brought to the machining position across from tools 23.

A second advantageous option consists of adjoining auxiliary turret 20, which allows machining of the front surface of a part previously machined by cutting tools 13 and 14 while the principal turret transfers previously machined parts and causes them to be machined by tools 23 on the counter-operation plate.

A final advantageous option consists of adjoining the third machining unit 24 which allows completion of lateral machining on a part held by one of the receiving stations 18 during or after machining it on the back surface by tools 23 on the counter-operation plate 22.

The foregoing description makes it obvious that the various options associated with the base unit allow an increased number of machining operations to take place simultaneously, and the simultaneous operations make it possible to produce a part in a fraction of the time previously required.

The present invention is not limited to the embodiments described, but may undergo various modifications and assume various embodiments obvious to one skilled in the art.

We claim:

1. A metal-working machine for machining a metal part comprising:

a first machining unit, defining a longitudinal first axis (15), comprising a machining head and means for holding, locating and axially displacing a part to be machined, a principal turret equipped with at least one front machining station for machining a front surface of a said part to be machined, and a second machining unit for machining a rear surface of a said part to be machined, wherein said at least one front machining station is located opposite said machine head (12) and said principal turret (16) is a revolving lathe-type turret, revolving around a second axis lying parallel to said first axis (15), and further comprises at least two receiving stations (18) movable in a direction parallel to said first axis, for receiving, holding and transferring a said part machined by at least one of said first machining unit and said at least one front machining station, and said second machining unit (22) is located opposite said principle turret and comprising a rear machining station (23) defining a third axis lying parallel to said first axis whereby a further said part to be machined can be located in said first machining unit (11, 12, 13, 14) and machined by at least one of said first machining unit (11, 12, 13, 14) and said at least one front machining station (17, 21) while a rear surface of a first said part to be machined, held at one of said receiving stations can be simultaneously machined by said second machining unit (22).

2. A machine according to claim 1, wherein said second machining unit (22) comprises at least one other machine station thereby to form several machining stations (23), each of said several machining stations defining a forth axis extending parallel to said first axis (15) and each of said several machining stations is positioned so that said receiving stations (18) may be brought to a position locate across from said several machining stations.

3. A machine according to claim 1, wherein said metal-working machine comprises a third machining unit (24) supporting at least one machining station (25) equipped with at least one tool (26) aligned perpendicular to said first axis (15).

4. A machine according to claim 3, wherein said tool (26) on said third machining station (25) is rotatable in a first direction.

5. A machine according to claim 3, wherein the third machining station (25) is axially movable in a direction perpendicular to said first axis (15).

6. A metal-working machine for machining metal components comprising:

a first machining unit, defining a longitudinal first axis (15), comprising a machining head and means for holding, locating and axially displacing a part to be machined, a principal turret equipped with at least one front machining station for machining a front surface of a said part to be machined, and a second machining unit comprising a second machining station for machining a rear surface of a said part to be machined, wherein said principal turret (16) is a revolving lathe-type turret and further comprises at least two receiving and holding stations (18) for receiving a said part machined by at least one of said first machining unit and said principal turret so that a rear surface that said part may be simultaneously machined by said second machining station (23) while a further said part is located and machined by at least one of said machining head (12) and said at least one front machining station (17, 21), and said metal-working machine further comprises an auxiliary turret (20) having at least one auxiliary turret machining station (21), and said auxiliary turret (20) is slidingly mounted on a slide member (19) extending perpendicular to said first axis (15).

7. A machine according to claim 6, wherein said at least one auxiliary turret machining station (21) is rotatable in a first direction.

8. A machine according to claim 6, wherein said at least one auxiliary turret machining station (21) is axially movable in a direction parallel to said first axis (15).

9. A machine according to claim 6, wherein said principal and said auxiliary turrets are both slidingly mounted on the same slide member (19) and are both movable in a direction perpendicular to said first axis (15).

* * * * *